United States Patent
Drostholm et al.

[11] 3,891,510
[45] June 24, 1975

[54] INTEGRATED APPARATUS FOR DISTILLING BATCHES OF CONTAMINATED SOLVENTS

[75] Inventors: Frede Hilmar Drostholm, Vedbaek; Kaj Ditlev Frederik Petersen, Valby; Ulf Raabo, Graested, all of Denmark

[73] Assignee: Frede Hilmar Drostholm, Denmark

[22] Filed: Apr. 18, 1973

[21] Appl. No.: 352,261

[52] U.S. Cl. ............................ 202/206; 202/160
[51] Int. Cl. ........................................... B01d 3/42
[58] Field of Search .......... 202/160, 181, 206, 202, 202/185 B; 203/2, DIG. 7; 196/132

[56] References Cited
UNITED STATES PATENTS

| | | | |
|---|---|---|---|
| 2,417,669 | 3/1947 | Vinyard | 203/2 |
| 2,455,243 | 11/1948 | Epprecht | 202/160 |
| 2,527,349 | 10/1950 | Black | 202/160 |
| 2,593,640 | 4/1952 | Whittington | 202/206 |
| 3,236,746 | 2/1966 | Poindexter et al. | 202/206 |
| 3,266,273 | 8/1966 | Pranovi | 202/160 |
| 3,269,919 | 8/1966 | Baily et al. | 202/160 |
| 3,350,279 | 10/1967 | Tolchin | 202/206 |
| 3,498,885 | 3/1970 | Holm et al. | 202/160 |

*Primary Examiner*—Norman Yudkoff
*Assistant Examiner*—Frank Sever
*Attorney, Agent, or Firm*—Synnestvedt & Lechner

[57] ABSTRACT

Equipment is provided having a distillation tank with a heater and a vapor offtake, with a condenser receiving the offtake vapor and delivering liquid condensate. A control system provides safety features including pressure and temperature responsive devices operative to shut off the heater and further including means for shut off of the heater when the tank is being filled. Still further provision is made for shutting off the heater under the influence of a float valve associated with the condensate discharge line and operative to shut off the heater under the influence of rise in level of condensate in the receiving vessel.

3 Claims, 4 Drawing Figures

PATENTED JUN 24 1975    SHEET 1    3,891,510

PATENTED JUN 24 1975
3,891,510
SHEET 2

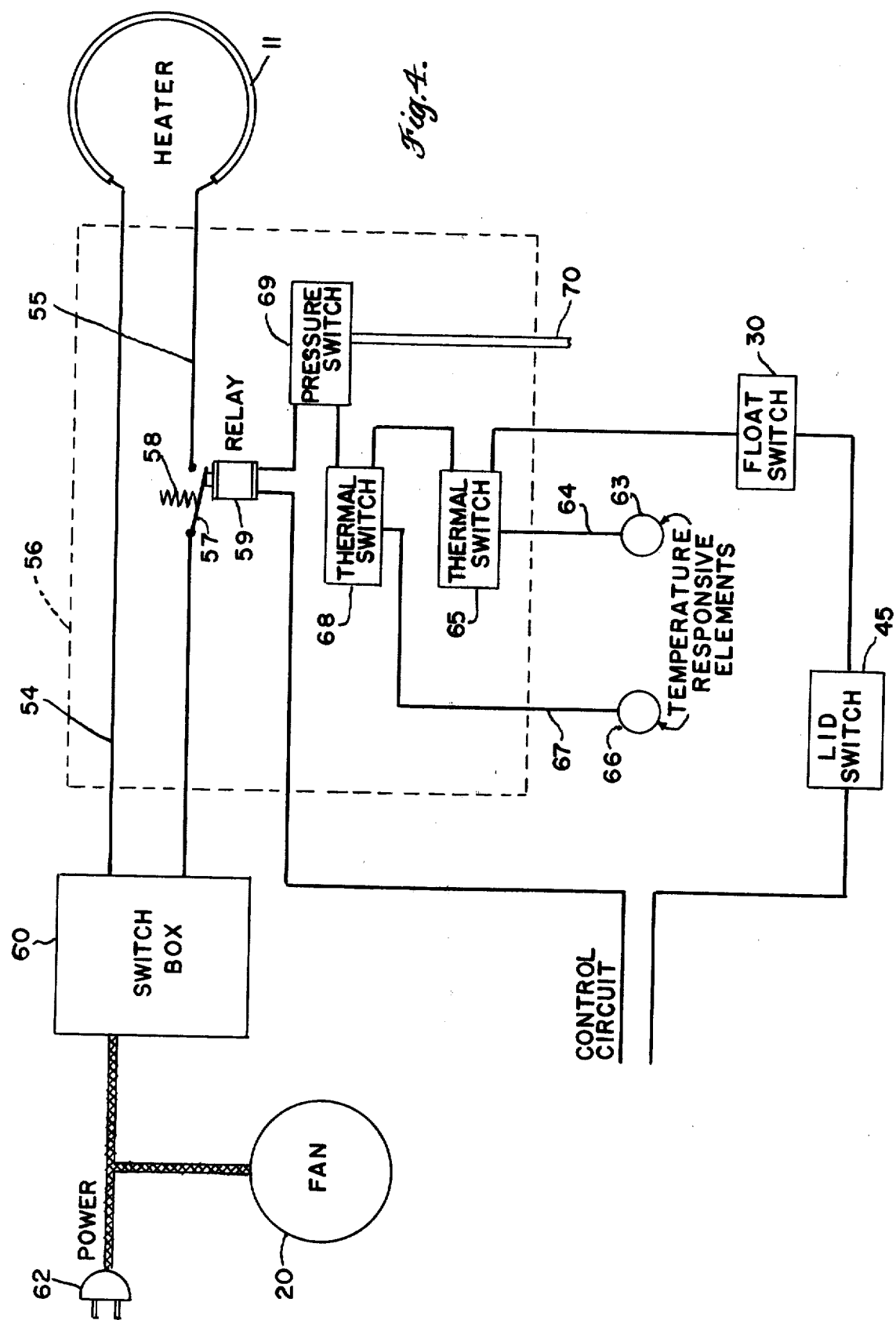

INTEGRATED APPARATUS FOR DISTILLING BATCHES OF CONTAMINATED SOLVENTS

This invention relates to equipment for purifying or cleaning liquids and is especially adaptable to the cleaning of solvents employed in the industries for cleaning of technical equipment or appearing as waste products in connection with chemical processes.

Although it is known to clean such solvents by distillation, most of the equipment available for this purpose is relatively large, requiring special installation, and is therefore not readily adaptable or economical for use in establishments where relatively small quantities of solvents are to be cleaned. Moreover, because most of the solvents employed for these purposes are not only highly volatile, but are also flammable or explosive, for considerations of safety, great care must be exercised in the handling of the distillation equipment. In view of this, with most prior equipment provided for cleaning solvents, it is not practical to place the operation of the equipment in the hands of inexperienced or untrained personnel.

One of the principal objects of the present invention is to provide a purification or distillation unit which is completely factory assembled and requires no special installation procedure at the point of use, other than the mere matter of making electrical power connections.

It is another object of the invention to provide a unit of the kind referred to which incorporates several novel and important safety factors which render it virtually impossible for the equipment to be mishandled in use in a manner dangerous to the safety of personnel and property.

For the foregoing purposes, the invention provides a unique combination of safety features including both pressure and temperature responsive devices for shutting off the heater. Still further provision is made for automatically shutting off the heater either when the unit is being charged with contaminated solvent to be cleaned, or when the vessel or tank receiving the purified condensate is approaching the limit of its capacity.

How the foregoing and other objects and advantages are attained will be clear from the following description referred to the accompanying drawings in which:

FIG. 4 is a diagrammatic or schematic illustration of parts of the control system.

Figure 1:
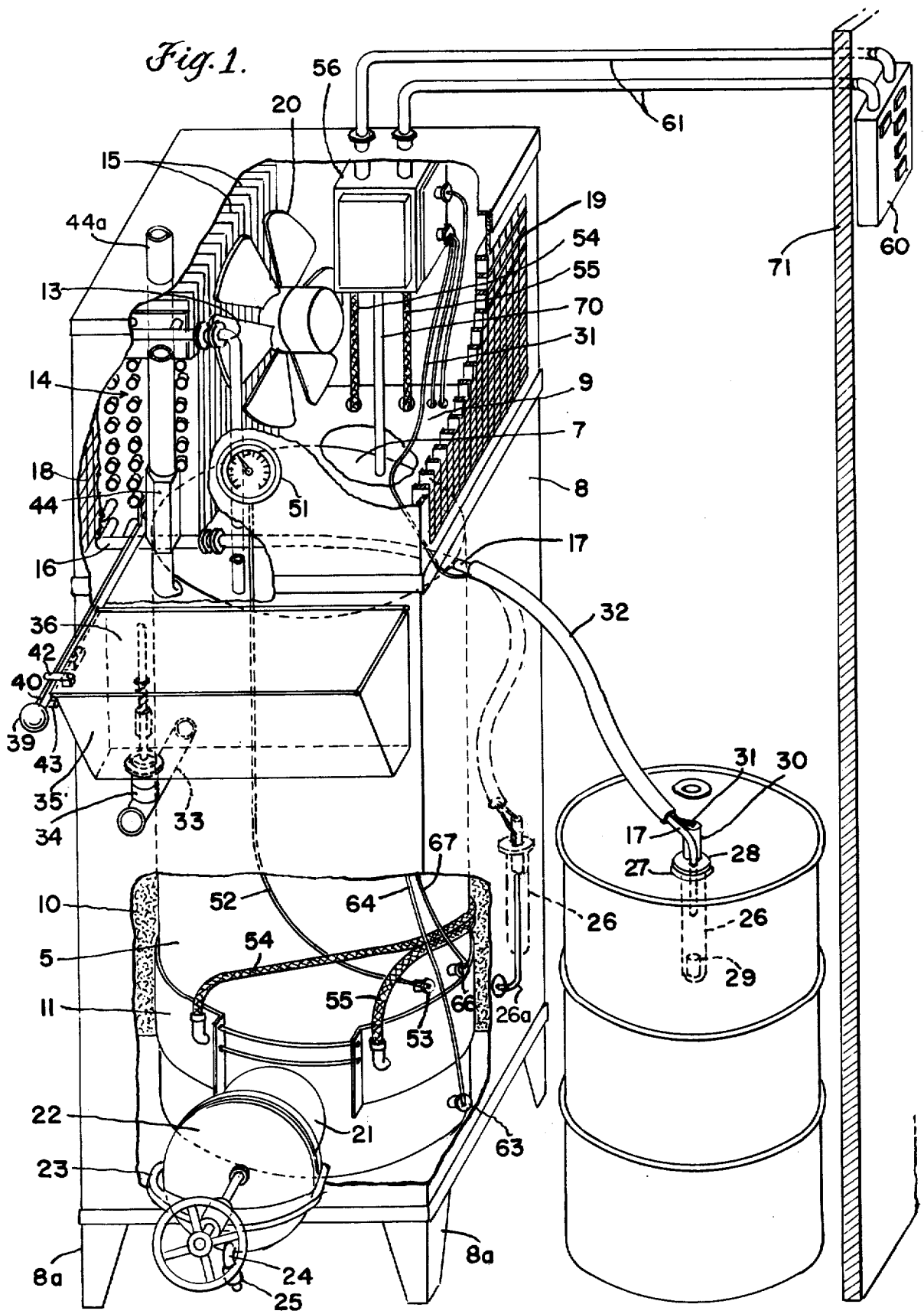
FIG. 1 is an isometric view of a unit constructed according to the present invention, with certain parts broken out in order to illustrate interior portions of the equipment, the equipment here being shown with the condensate offtake associated with a receiving drum.

The equipment includes a distillation tank or boiler 5, advantageously of cylindrical form and preferably constructed of sheet stainless steel, being closed at the bottom and top by the walls 6 and 7. The distillation tank is enclosed within a rectangular casing 8 having a partition or dividing wall 9 above the upper end of the distillation tank in order to provide a compartment for receiving various portions of the equipment to be described. Thermal insulation 10 is provided between the distillation tank 5 and the casing 8 around the vertical side walls and also between the upper wall 7 of the tank and the partition 9, as is readily seen in FIG. 2. However the bottom wall 6 of the tank is exposed, without insulation, as it is desired to provide for heat transfer through the bottom wall to the surrounding atmosphere for certain purposes to be mentioned hereinafter. To insure air circulation against the bottom wall 6, the casing 8 and thus the unit as a whole is mounted upon feet 8a, supporting the bottom of the distillation tank somewhat above floor level.

Figures 2, 3:
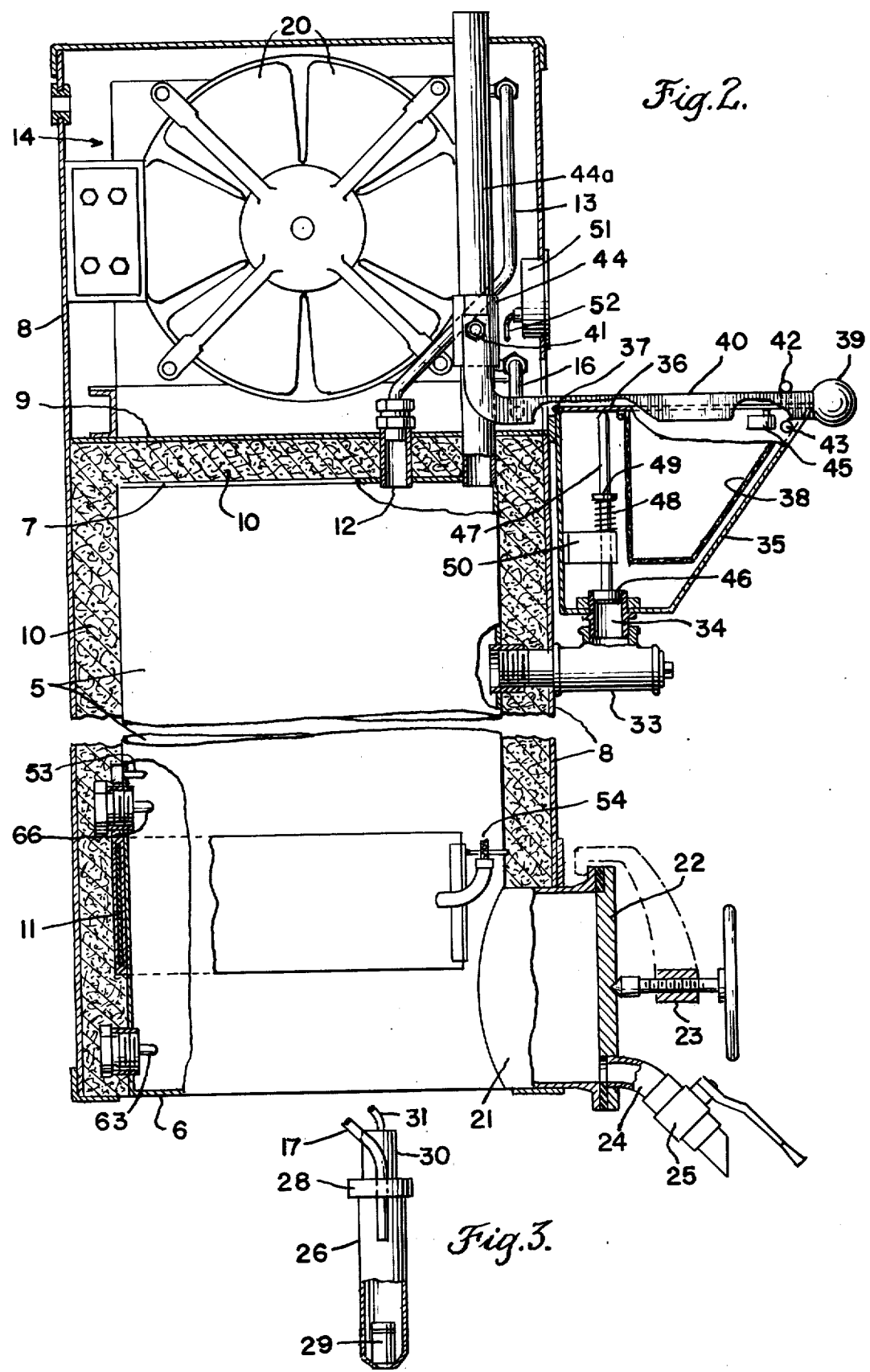
FIG. 2 is a vertical sectional view through the equipment, with some parts shown in elevation.
FIG. 3 is an enlarged detailed view of the condensate delivery nozzle, with parts broken away and shown in section.

The distillation tank is provided with a heater, conveniently an electrical heater, in the form of a band 11 applied externally to the cylindrical wall of the distillation tank 5 in a region toward the lower end thereof but spaced somewhat above the bottom wall 6 as clearly appears in both FIGS. 1 and 2. When the distillation tank is charged and the charge is heated, the vapor released is delivered through the offtake 12 through the top wall 7 and the partition 9, the vapor being conducted by the offtake pipe 13 to the inlet end of the condenser 14 having a multiplicity of tubes provided with fins 15 and having an offtake 16 for the condensate which is connected with a flexible discharge hose 17. The condenser 14 may be of any suitable known type and is mounted in the equipment above the partition 9 adjacent one side thereof with an open grille 18 in the wall of the casing adjacent to the condenser. Another open grille 19 is also provided in the casing wall opposite to the grille 18.

An air circulating or cooling fan 20 is mounted in the compartment above the partition 9. The fan is driven by a motor supplied with current independently of the heater element 11 as will further be described, and the fan is positioned to draw air through the upper portion of the casing, for instance inwardly through the grille 19 and deliver it outwardly through the grille 18 after the circulating air passes over the fins 15 of the condenser. As shown, the fins 15 are positioned in planes generally paralleling the path of the circulating air.

Toward the bottom of the distillation tank 5, a fitting 21 is provided projecting through the insulation and the side wall of the casing 8, this fitting being equipped with a lid 22 and a fastening device 23, in order to provide access to the lower portion of the distillation tank at times when it is desired to clean the tank and remove deposits from the bottom. A drain connection 24 is also provided through the lid 22, this drain connection having a valve 25 manually operable to permit discharge of undistilled products.

The flexible tube 17 above referred to for delivery of the condensate to a receiving vessel is preferably associated with a nozzle structure 26 as shown in FIGS. 1 and 3, this nozzle being adapted to fit into the bung hole of a receiving drum such as shown in 27 in FIG. 1. It is contemplated that the nozzle should fit only loosely in the bung hole so that air may readily be discharged during the filling of the receiving vessel. The collar 28 on the nozzle structure prevents the nozzle from dropping into the drum and establishes a definite vertical position with relation to the top wall of the drum. This is important because it is desired to automatically provide for termination of the filling operation when the capacity of the drum is approached. For this purpose, the nozzle structure 26 is hollow and contains a float 29 adapted to be raised on the surface of the liquid or condensate solvent being introduced into the drum. Toward its upper end the nozzle structure 26 carries a micro switch 30 adapted to be engaged by the float 29, this micro switch being connected as indicated at 31 with the control system for the power circuit of the heater 11 thereby providing for shut off of the heater power when the drum capacity is approached. In this way the distillation heater is shut off automatically to thereby avoid unintentional spilling of solvent, even if the equipment remains unattended. For convenience the electrical connection 31 to the micro switch in the nozzle structure may be housed in a flexible sheath 32 along with the flexible tube 17.

When the equipment is not in use, the nozzle structure 26 is desirable mounted upon the pin 26a projecting from the side wall of the casing 8. This pin is of a length sufficient to raise the float 29 within the nozzle structure 26 sufficiently to actuate the micro switch 30 and thereby prevent operation of the heater element. The pin 26a thus not only serves as a support for the nozzle and the flexible condensate delivery tube when not in use, but also prevents operation of the equipment unless the nozzle is lifted from the pin 26a, as is intended when the nozzle is to be inserted into the drum or other receiving vessel.

For purposes of filling or charging the distillation tank, the tank is provided with an inlet connection 33 having an upwardly presented inlet tube 34 the upper end of which is in communication with the lower portion of a filling funnel 35. The filling funnel is provided with a lid 36 hinged at 37 so that the lid may be displaced or swung open to permit introduction of a charge of solvent to be cleaned. Within the funnel 35 a strainer or filter 38 may be provided in order to eliminate particulate impurities, the strainer preferably being readily removable for purposes of cleaning.

The lid is adapted to be opened by means of the knob 39 at the end of a handle or lever 40 which is pivotally mounted at 41. The lever is positioned between opposed abutments 42 and 43, the former of which projects from the lid and the latter of which projects from the funnel. Abutment 42 transmits the upward motion from the lever to the lid, and abutment 43 limits the downward motion of the lever. At the pivot point 41 for the lever 40 the lever is connected with a rotative valve lying within the valve body 44 which is positioned in the vent pipe 44a. This vent pipe extends from the upper region of the distillation chamber upwardly through the chamber above the partition 9 and the casing 8 and discharges at a point exterior of the casing. The lever 40 thus not only serves to raise and lower the filling lid, but also serves to operate the valve within the valve body 44. When the lever is raised to open the lid on the filling funnel, the vent valve is opened and this is of importance because at the time of filling or charging the distillation tank it is necessary to provide for venting of the interior of the tank so that the filling operation will not tend to be impeded by increase in the pressure within the distillation tank. The stop or abutment 43 prevents motion of the lever 40 downwardly beyond the closed position of the valve in body 44.

The opening of the lid 36 also serves to actuate another micro switch indicated at 45, this switch, as in the case of the micro switch 30 at the filling nozzle, also being associated with the control circuits and providing for interruption of the power fed to the heater element while the lid is open.

The upper end of the filling inlet tube 34 is formed as a valve seat for the valve 46 having a stem 47, this valve being biased in an upward direction, i.e., toward open position, by means of a compression spring 48 reacting between an abutment 49 and the fixed bracket 50 which serves as a guide for the valve stem 47.

When the lid of the filling funnel is lifted, the spring 48 raises the valve 46 and opens the inlet tube 34 so that the solvent charge may be introduced into the distillation tank.

Because of the arrangement of the valve 46, this valve is exposed on its underside to the pressure in the distillation tank and if the pressure abnormally increases within the tank that pressure will lift the valve 46 and through the valve stem 47 will raise the lid 40, thereby providing free discharge in reverse direction through the filling channel. This lifting of the lid will also raise the lever 40 and if the pressure on the valve 46 is sufficient to lift the lid and lever to a substantial extent, this motion will also open the valve in the valve body 44, thereby providing another exhaust or vent passage for dissipation for abnormal pressure developed within the distillation tank. It is contemplated that the valve in body 44 be of a type easily turned, in order to assure free operation for the purpose just mentioned.

A temperature indicator 51 is mounted in one of the side walls of the casing and is provided with a connection 52 with a temperature responsive element 53 positioned in the tank just above the heater element 11.

As hereinabove briefly mentioned, the control system for the equipment still further includes both temperature and pressure responsive devices acting to diminish or terminate the current flow in the power circuit of the heater element. This power circuit includes cables 54 and 55 which extend from the control box 56 in the upper portion of the casing down to the heater element 11 as shown in FIGS. 1 and 2. See also the schematic diagram of FIG. 4 in which the control box 56 is indicated by dash lines enclosing certain of the circuit parts.

Power is supplied to the control box not only for delivery to the heater element, but also for the purpose of operation of the control system including parts enclosed within the dash line 56 of the schematic diagram of FIG. 4.

The power circuit 54–55 to the heater is adapted to be controlled by the switch 57 adapted to be opened by a spring 58 and adapted to be closed by a relay solenoid 59. The relay solenoid is arranged to be controlled by various of the control switches including the thermally and pressure responsive switches to be described below as well as the float switch 30 and the lid switch 45 already described above.

In connection with the circuit of FIG. 4, it should be kept in mind that the illustration therein is diagrammatic and representative of a circuit which may be used, being presented in simplified form for clarity of disclosure.

As seen in FIGS. 1 and 4, a switch box 60 is provided, being equipped with "on-off" buttons and preferably also with signal lights for purposes to be mentioned below. As seen in FIG. 1, the switch box 60 is connected with the control box 56 by connections extended through cables 61.

The power input to the system is indicated in FIG. 4 at the plug 62 and the connection of the fan 20 to the power supply in advance of the switch box 60 as illustrated in FIG. 4 is representative of the fact that the fan 20 is desirably arranged for continued operation notwithstanding operation of the control circuits to terminate the flow of heating current to the heater element 11.

In FIGS. 1 and 2 a temperature responsive element is arranged in the distillation tank near the bottom thereof and is provided with a connection 64 extended to the control box 56 and serves to control the thermal switch 65 (see FIG. 4) within the control box. Similarly another temperature responsive element 66 is associated with the heater element iself and has a connection 67 extended to the control box 56 for control of the thermal switch 68, each of the thermal switches (65 and 68) being operative to break the power circuit to the heater.

Still further the control box 56 contains a pressure responsive switch 69 which is subjected to the pressure in the distillation tank through the pipe 70 which extends from the control box 56 downwardly for communication with the upper end of the tank. Any one of these switches (30, 45, 65, 68 and 69) will act to diminish the heating. In effect they are all in series and all must be closed in order to complete the power circuit to the heater element. The control action is preferably effected by actually shutting off the current flow in the power circuit to the heater. However, it is possible that at least some of the control devices could operate in the manner of proportional controllers, according to which the heater current is reduced but not necessarily completely shut off under certain of the control conditions.

It is of particular advantage in the system as disclosed that both pressure and temperature responsive devices are employed in the control system, since, in this way, safety factors are introduced which will avoid undesirable abnormal or hazardous conditions of operation. In connection with the circuitry, it is pointed out that within the distillation unit itself, including the control box 56 in which most of the control circuits are enclosed, it is contemplated that all of these parts be arranged so as to be explosion proof, i.e., completely sealed from the surrounding atmosphere so that even in the event of flammable or explosive vapor being released within the unit, there is no hazard of explosion.

In use of the equipment it is contemplated that the cables 61 providing the interconnection between the control box 56 and the switch box 60 be extended from the space or room in which the unit is installed through the wall to another room, so that the switch box 60 which need not necessarily be explosion proof, will be isolated from the equipment. Such a wall is indicated in FIG. 1 at 71 and it will be noted that the switch box 60 is located on the opposite side of the wall 71 from the equipment itself.

The switch box 60 desirably not only has "on-off" buttons, but also at least several signal lights which may be associated with various of the control switches, in order to indicate which one is open.

It is contemplated that various of the control devices be adjusted or set at various points which are predetermined at the factory, rather than providing for adjustment "in the field" by the users. For example, in a typical equipment adapted to the cleaning of a range of common solvents, the pressure responsive switch 69 should be set a value so that the heater circuit will be opened if the pressure in the distillation circuit will be opened if the pressure in the distillation tank rises appreciably above atmospheric pressure. This may typically correspond to a pressure setting of 0.1 kilograms/sq. cm. With a typical range of solvents this will insure that the solvent vapor will be fully condensed and suitably cooled before delivery from the equipment. Such a setting also provides for protection against development of abnormally high pressures.

The thermostatic or temperature responsive elements 63 and 66 are desirably selected or adjusted to respond in a manner to break the heater power circuit at temperatures well within the range of safety for the equipment, and it is preferred that the temperature responsive element 63 be set to respond at a temperature somewhat lower, for instance 10°C lower, than the temperature at which the element 66 responds.

It is particularly advantageous to provide the two temperature responsive elements 63 and 66, with one located in the bottom of the tank and the other in the region of the heater element, preferably adjacent the upper edge of the heater element, because the element 66 will respond to turn off the heater as the liquid level in the distillation tank recedes and starts to uncover the zone in which the heater is located. This will terminate a normal distillation operation. On the other hand the element 63 while remaining submerged under virtually all normal conditions will respond under special conditions, for instance in the event that solvents or liquids introduced contain by-products or impurities having a tendency to develop an exothermic reaction upon elevation of temperature under the influence of the heater. Such ingredients tending to produce such exothermic reactions, if present, will gravitate to the bottom of the tank. The element or sensor 63 is thus located in the region where such reactions might occur. Moreover the fact that the bottom wall 6 of the tank is not insulated provides for some dissipation of heat which may be developed from exothermic reactions, this feature also being of importance in avoiding undesirable elevation in temperature.

In normal use of the equipment, the lid for the filling funnel is raised and a charge is introduced, and this charge is treated as a batch, after which another bath is introduced and treated. At any stage between batch treatments undesired materials may be drawn off through the drain connection and valve 24, 25, and at longer intervals the lid 22 may be removed in order to effect cleaning of the distillation chamber.

The various features of the equipment as described above provided an exceptional degree of safety and reliability in equipment of this kind, and this is accomplished in a unit of relatively small size which may readily be utilized by small establishments for the cleaning of solvents used and which may also be operated safely by inexperienced personnel.

We claim:

1. Equipment for cleaning solvents including a tank for containing a batch of liquid solvent for distillation at relatively lower pressure, and having an inlet for sequential introduction of batches of solvent to be distilled, means normally closing said inlet during distillation of the batches, electric heating means in heat exchange relation with a lower region of the tank, condensing means coupled to said tank, means providing for discharge of condensate into an associated condensate accumulation vessel, a power circuit for energizing said heating means, and safety control means for said power circuit, preventing energization of said heating means under abnormal conditions which might be hazardous to the equipment or its operator, said safety control means comprising: switch means responsive to the temperature of the liquid solvent in said tank, and operative to terminate the flow of current in said power circuit when the temperature exceeds a predetermined value; the condensate discharge means comprising a flexible condensate delivery connection having a discharge end portion adapted to be removably inserted into the top of an associated condensate accumulation vessel and a switch element carried by said discharge end portion of the flexible condensate delivery connection, the switch element being responsive to the accumulation of condensate in such an associated vessel, and operative to terminate the flow of current in said power circuit in response to rise in the level of the condensate accumulating in such vessel.

2. Equipment for cleaning solvents including a tank for containing a batch of liquid solvent for distillation at substantially atmospheric pressure, and having electric heating means in heat exchange relation with a lower region of the tank, condensing means coupled to said tank, means providing for discharge of condensate into an associated condensate accumulation vessel, a power circuit for energizing said heating means, and safety control means for said power circuit, preventing energization of said heating means under abnormal conditions which might be hazardous to the equipment or its operator, said safety control means comprising: switch means responsive to the temperature of the liquid solvent in said tank and including a pair of switches each having associated therewith a corresponding temperature-responsive element, one temperature-responsive element being disposed in the liquid in a lower portion of said tank and being responsive to the temperature of the liquid in said lower portion of the tank, and the other temperature-responsive element being disposed in the liquid in a higher portion of said tank and being responsive to the temperature of the liquid in said higher portion of the tank, the lower of said temperature-responsive elements being operative to control its associated switch and terminate the flow of current in said power circuit when the temperature rises above a first predetermined value, and the higher of said temperature-responsive elements being operative to control its associated switch and terminate the flow of current in said power circuit when the temperature rises above a second predetermined value higher than said first predetermined value.

3. Equipment for cleaning solvents including a tank for containing liquid solvents for distillation, and having lid means providing for filling of the tank, electric heating means in heat exchange relation with a lower region of the tank, condensing means coupled to said tank, means providing for discharge of condensate into an associated condensate accumulation vessel, a power circuit for energizing said heating means, and safety control means for said power circuit, preventing energization of said heating means under abnormal conditions which might be hazardous to the equipment or its operator, said safety control means comprising: first switch means responsive to pressure within said tank, and operative to terminate the flow of current in said power circuit when pressure in said tank exceeds a predetermined value; second switch means responsive to the temperature of the liquid solvent in said tank, and operative to terminate the flow of current in said power circuit when the temperature exceeds a predetermined value; third switch means responsive to the accumulation of condensate in such an associated vessel, and operative to terminate the flow of current in said power circuit in response to rise in the level of the condensate accumulating in such vessel, and fourth switch means associated with said lid means and operative to terminate the flow of current to said power circuit in response to opening of said lid means, the four recited switch means being series-connected.

* * * * *

UNITED STATES PATENT OFFICE
CERTIFICATE OF CORRECTION

PATENT NO. : 3,891,510
DATED : June 24, 1975
INVENTOR(S) : Frede Hilmar Drostholm, Kaj Ditlev Frederik Petersen and Ulf Raabo It is certified that error appears in the above-identified patent and that said Letters Patent are hereby corrected as shown below:

Col. 5, line 3, after "responsive element" insert --63--;

Col. 5, line 63, delete --opened if the pressure in the distillation circuit will be--.

Signed and Sealed this fourteenth Day of October 1975

[SEAL]

Attest:

RUTH C. MASON
Attesting Officer

C. MARSHALL DANN
Commissioner of Patents and Trademarks